United States Patent
Mizobata

(10) Patent No.: US 8,696,066 B2
(45) Date of Patent: Apr. 15, 2014

(54) VEHICLE SEAT

(75) Inventor: Hiroshi Mizobata, Seto (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 44 days.

(21) Appl. No.: 13/118,987

(22) Filed: May 31, 2011

(65) Prior Publication Data

US 2011/0298268 A1 Dec. 8, 2011

(30) Foreign Application Priority Data

Jun. 4, 2010 (JP) .................. 2010-128742

(51) Int. Cl.
- A47C 7/00 (2006.01)
- A47C 7/02 (2006.01)
- A47C 7/42 (2006.01)

(52) U.S. Cl.
USPC .............. 297/440.2; 297/440.22; 297/440.11; 297/452.56

(58) Field of Classification Search
USPC ............... 297/452.13, 452.56, 452.57, 440.2, 297/440.14, 440.1, 452.14, 452.15, 452.31, 297/452.59, 440.22, 440.11
See application file for complete search history.

(56) References Cited

U.S. PATENT DOCUMENTS

| | | | | |
|---|---|---|---|---|
| 3,393,941 A * | 7/1968 | Grosfillex | ................ | 297/440.22 |
| 4,805,962 A * | 2/1989 | Sacco et al. | .............. | 297/452.14 |
| 4,892,355 A * | 1/1990 | Fend | ......................... | 297/440.22 |
| 6,220,661 B1 * | 4/2001 | Peterson | .................... | 297/218.4 |
| 6,332,651 B1 * | 12/2001 | Horisawa | ................. | 297/452.11 |
| 6,942,300 B2 * | 9/2005 | Numa et al. | ............. | 297/452.56 |
| 7,478,877 B2 * | 1/2009 | Lhomme et al. | ......... | 297/256.12 |
| 7,850,246 B2 * | 12/2010 | Kolich et al. | ............ | 297/452.15 |
| 2009/0179477 A1 * | 7/2009 | Yamazaki et al. | ....... | 297/452.18 |
| 2009/0224592 A1 * | 9/2009 | Chen et al. | ................. | 297/440.2 |
| 2010/0201178 A1 | 8/2010 | Mizobata | | |
| 2010/0259089 A1 | 10/2010 | Mizobata et al. | | |
| 2011/0018328 A1 * | 1/2011 | Ko | ............ | 297/452.18 |
| 2011/0169317 A1 * | 7/2011 | Fujita et al. | ................ | 297/452.2 |
| 2011/0254342 A1 * | 10/2011 | De Maina | ................ | 297/452.18 |

FOREIGN PATENT DOCUMENTS

| | | |
|---|---|---|
| JP | 11266959 | 10/1999 |
| JP | 11342037 | 12/1999 |
| JP | 4069307 | 4/2008 |
| JP | 4228355 | 2/2009 |

OTHER PUBLICATIONS

U.S. Appl. No. 13/152,709 to Hiroshi Mizobata, which was filed on Jun. 3, 2011.

* cited by examiner

Primary Examiner — David R Dunn
Assistant Examiner — Richard Lowry
(74) Attorney, Agent, or Firm — Greenblum & Bernsein, P.L.C.

(57) ABSTRACT

An engaging structure has a first engaging portion and a second engaging portion provided on at least one portion from among a first attaching portion and a second attaching portion, and an engagable portion provided on another portion that is different from the one portion. The first attaching portion is overlapped with the second attaching portion such that the first engaging portion abuts against a first edge of the other portion and the second engaging portion abuts against a second edge of the other portion that is different from the first edge. A support member is engaged with a frame member by one of the first engaging portion or the second engaging portion being hooked onto the engagable portion.

3 Claims, 7 Drawing Sheets

VEHICLE SEAT

INCORPORATION BY REFERENCE

The disclosure of Japanese Patent Application No. 2010-128742 filed on Jun. 4, 2010 including the specification, drawings and abstract is incorporated herein by reference in its entirety.

BACKGROUND OF THE INVENTION

1. Field of the Invention

The invention relates to a vehicle seat that includes a frame member and a support member (i.e., a member that supports an occupant) that is attached to the frame member.

2. Description of the Related Art

Japanese Patent No. 4228355 describes one such vehicle seat. This vehicle seat includes a seat cushion and a seat back that is connected in an upright position to the seat cushion. The seat cushion includes a frame member and a support member. The frame member is a generally rectangular frame-shaped member that forms a seat frame and includes an upright piece. This upright piece is a flat plate member that extends in the longitudinal direction of the seat, and is arranged on an upper surface (a surface facing the support member) of the frame member. Also, the support member is a member that supports an occupant, and includes a frame-shaped body and a sheet-shaped body. The frame-shaped body is a frame-shaped member that has a shape that follows the outer shape of the frame member (i.e., the sitting side of the frame member), and includes a hole into which the upright piece is inserted. Also, the sheet-shaped body is a sheet-shaped member that is able to elastically expand and contract, and is stretched across the center of the frame-shaped body. With the technology described in Japanese Patent No. 4228355, the upright piece is inserted into the hole while the frame-shaped body is overlapped with the frame member. Then after the upright piece is made to protrude from the hole, it is bent in the width direction of the seat, thus enabling the support member to be fixed to (so as not to become detached from) the frame member.

Incidentally, with this kind of vehicle seat, considering maintenance and design changes and the like of the seat, it is preferable to be able to detach the support member from the frame member. Therefore, with a seat back described in Japanese Patent No. 4069307, an inner portion of a support member is made hollow and is able to be covered by a frame member. Then a protruding portion (having a flat plate shape) that extends in the vertical direction of the seat is formed on a side surface of the frame member, and a groove portion into which this protruding portion can be inserted is formed in the frame-shaped body. Then the support member is slide downward from above the frame member (that is in an upright position), and covered. Next, the protruding portion is fitted into the groove portion, thereby enabling the support member to be detachably attached to the frame member.

Incidentally, with the technology described in Japanese Patent No. 4069307, the support member is slid downward from above the frame member (that is in an upright position). This presents difficulties, such as the support member hitting another member such as the ceiling or the like, for example, when attaching the frame member while inside the vehicle. Also, with the technology described in Japanese Patent No. 4069307, the support member is retained by the engagement of the protruding portion in the groove portion (i.e., by one type of engaging structure), so the engaging force of the support structure with respect to the frame member is somewhat weak. Therefore, the support member rattles against the frame member when an occupant sits down, for example. That is, the structure provides fairly weak attachment stability. Therefore, the technology described in Japanese Patent No. 4069307 is simply unable to be used with the technology described in Japanese Patent No. 4228355, considering the attachment stability and workability and the like.

SUMMARY OF THE INVENTION

The invention thus provides a vehicle seat in which a support member is able to be compactly attached to and detached from a frame member, while maintaining the attachment stability.

One aspect of the invention relates to a vehicle seat that includes a seat structure member such as a seat cushion or a seat back. This seat structure member includes a frame member that forms a seat frame, and a support member that supports an occupant. Moreover, the vehicle seat includes an engaging structure. The support member is detachably attached to the frame member via this engaging structure. With this kind of structure, the support member is preferably able to be compactly attached to and detached from the frame member, while maintaining the utmost attachment stability.

Thus, in the aspect of the invention described above, the frame member has a first attaching portion formed along at least a portion of a sitting side of the frame member, and the support member has a second attaching portion that is overlapped with the first attaching portion. Also, the engaging structure has a first engaging portion and a second engaging portion provided on one portion from among the first attaching portion and the second attaching portion, and an engagable portion provided on another portion that is different from the one portion.

Then, the first attaching portion is overlapped with the second attaching portion (from the sitting side of the seat). Then the first engaging portion is abutted against a first edge of the other portion and the second engaging portion is abutted against a second edge of the other portion that is different from the first edge. Furthermore, one of the first engaging portion or the second engaging portion is hooked onto the engagable portion such that the support member is attached to (i.e., engaged with) the frame member. In this aspect, the support member is able to be engaged (compactly) with the frame member from the sitting side of the seat. Also, when engaging the support member with the frame member, the first engaging portion or the second engaging portion hooks onto the engagable portion, while the other portion is gripped by the first engaging portion and the second engaging portion. That is, this structure provides excellent attachment stability.

In the vehicle seat according to the aspect described above, the first engaging portion and the second engaging portion may be alternately arranged along an outer shape of one portion of the first attaching portion or the second attaching portion. Alternately arranging the first engaging portion and the second engaging portion enables the other portion to be held with an appropriate amount of gripping force. Therefore, the other portion can be relatively easily attached between the first engaging portion and the second engaging portion, as well as relatively easily detached from those engaging portions. That is, this structure provides excellent attachability and detachability.

According to this aspect of the invention, the support member is able to be compactly attached to and detached from the frame member, while maintaining the utmost attachment stability. Also, the attachability and detachability of the support member can be improved.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
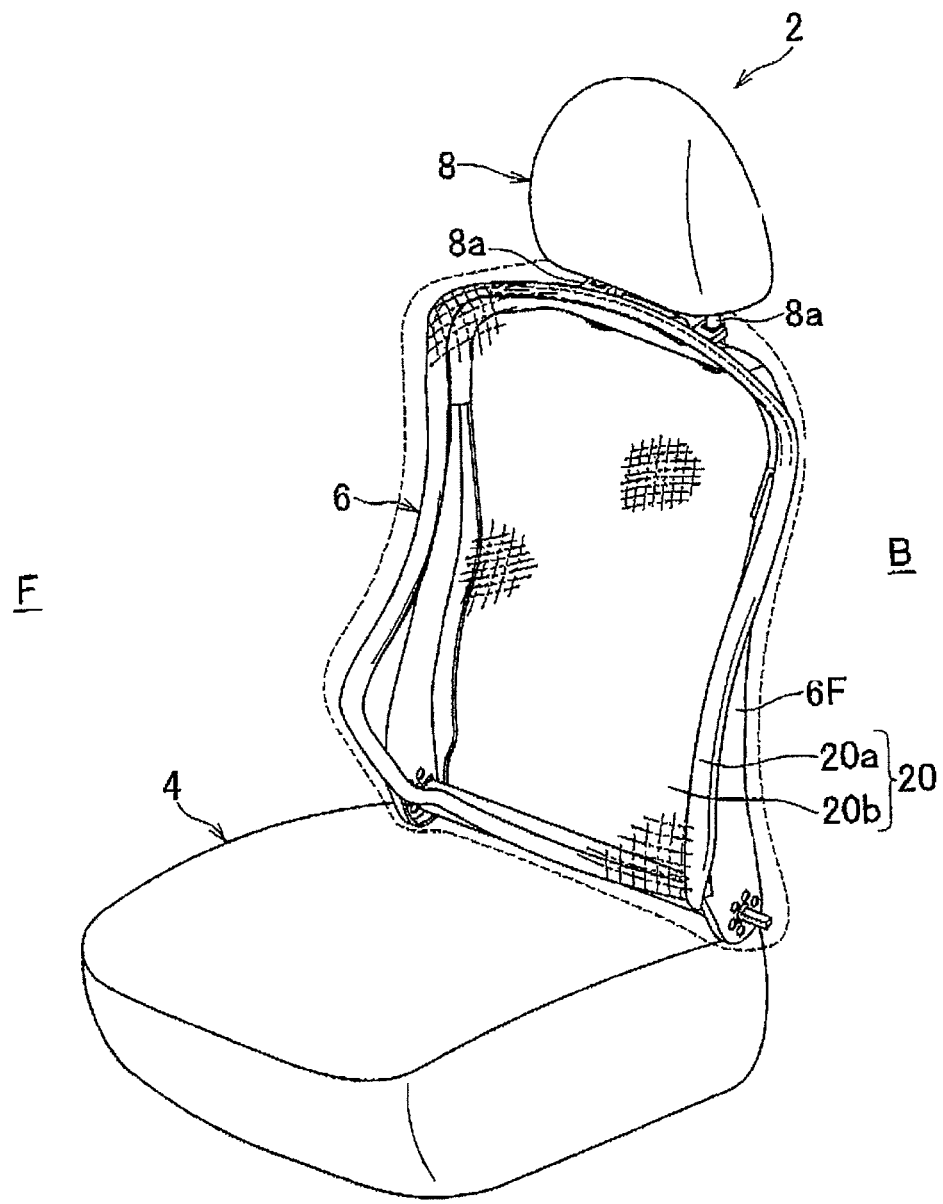
FIG. 1 is a partially transparent perspective view of a vehicle seat according to an example embodiment of the invention.

Hereinafter, example embodiments of the invention will be described with reference to FIGS. 1 to 7. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat. A vehicle seat 2 in FIG. 1 has a seat cushion 4, a seat back 6, and a headrest 8 (all of which are examples of a seat structure member). The headrest 8 has a pair of stay members 8a and is attached to an upper portion of the seat back 6. The pair of stay members 8a are rod-shaped members that are arranged in parallel a predetermined distance apart from each other on a lower portion of the headrest 8.

The seat back 6 is a member that is reclinably connected to the seat cushion 4 (see FIGS. 1 to 3 and 6). The seat back 6 in this example embodiment includes a frame member 6F, a support member 20, a board member 9, and a supplementary member 60. The board member 9 is a flat plate member made of resin, and is arranged on a back surface of the seat back 6. In this example embodiment, a support member 20 attaches to the frame member 6F via an engaging structure that will be described later. With this kind of seat structure, it is preferable that the support member 20 be able to be compactly detached from the frame member 6F while maintaining the utmost attachment stability. Therefore, in this example embodiment, the support member 20 is able to be compactly detachably attached to the frame member 6F while maintaining the utmost attachment stability, by a structure that will be described later. The various structures will now be described in detail.

Figure 2:
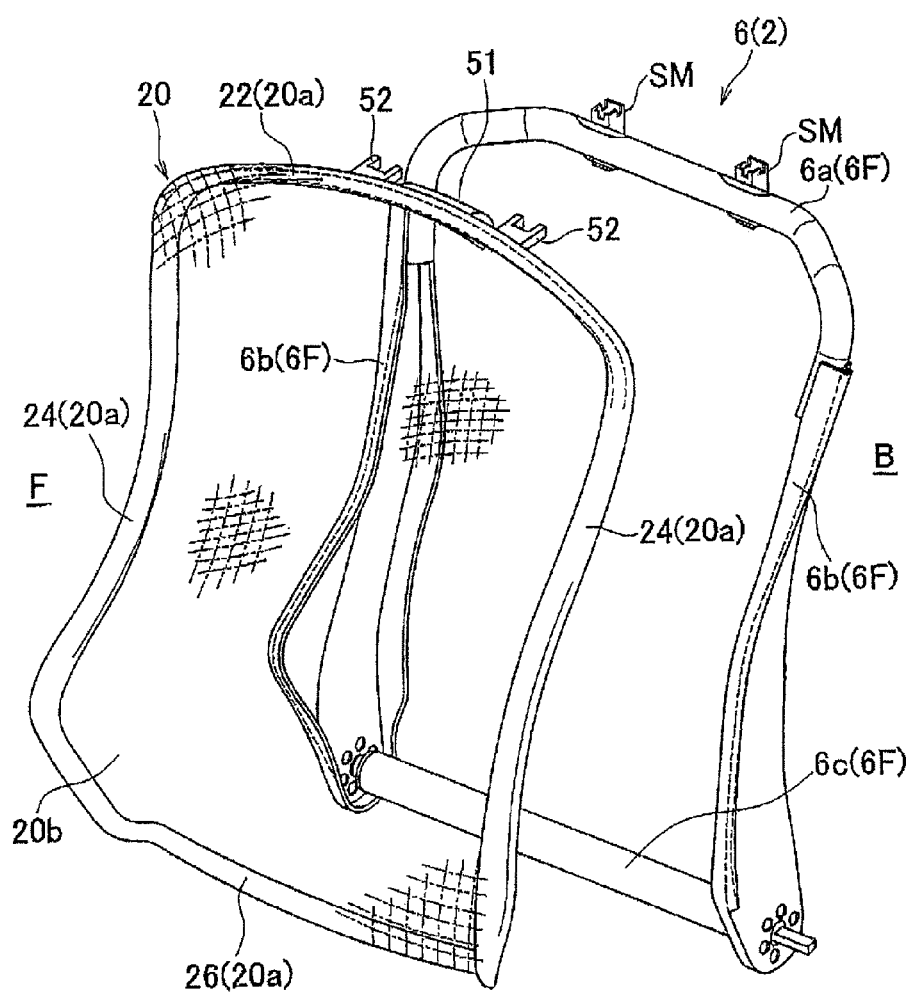
FIG. 2 is a perspective view of a frame member and a support member before they are attached together.
Figure 6:
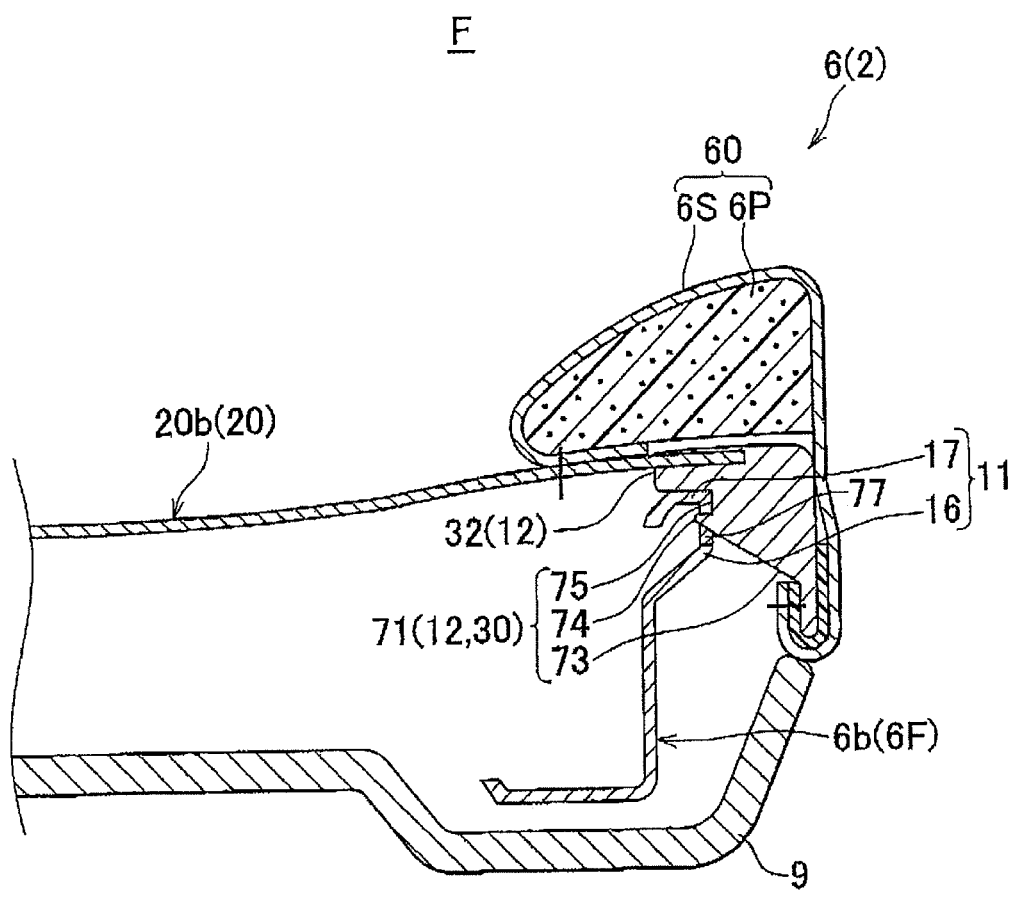
FIG. 6 is a cross sectional view of a portion of the seat back.
Figure 7:
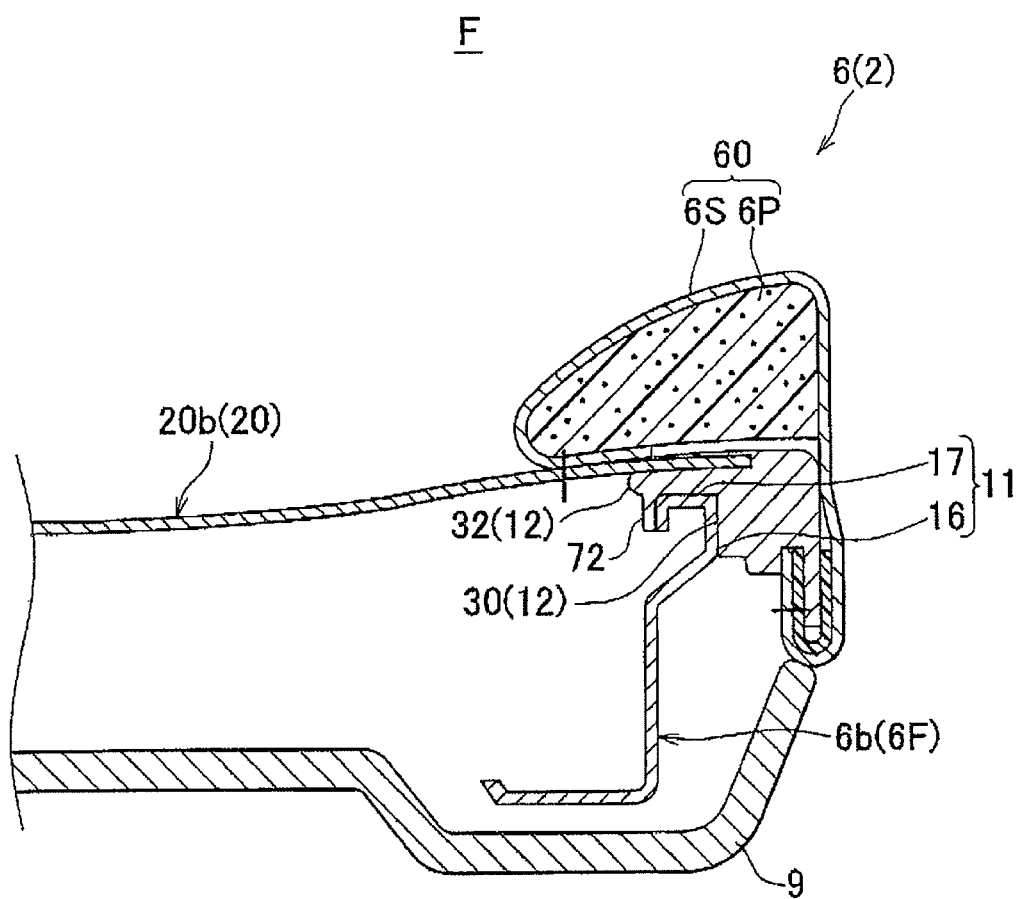
FIG. 7 is another cross sectional view of a portion of the seat back.

The frame member 6F (that has a generally inverted U-shaped frame body) includes an upper frame 6a, a pair of side frames 6b, a lower frame 6c, and a first attaching portion 11 (see FIGS. 2, 6, and 7). The upper frame 6a is a rod-shaped member (that has a generally inverted U-shape when viewed from the front) that forms a seat upper portion, and includes a pair of support members SM. The pair of support members SM are cylindrical members (that are generally rectangular) into which the stay members 8a can be inserted. In this example embodiment, the pair of support members SM are arranged parallel to each other, and a predetermined distance apart from each other, on a rear surface side of the upper frame 6a. Also, the pair of side frames 6b are flat plate members that form seat side portions. Each side frame 6b has an outside portion (i.e., a side portion) 16 and an inside portion (i.e., a front portion) 17. The outside portion 16 is a crank-shaped (in a cross-sectional view) portion, and forms the contour of the seat side portion. Also, the inside portion 17 is a portion that juts out from the outside portion 16 toward the inside of the seat. Also, the lower frame 6c is a rod-shaped member that is bridged between the pair of side frames 6b at a seat lower portion.

The first attaching portion 11 is a portion formed along at least one portion of the sitting side of the frame member 6F, and includes an engagable portion 77 (a constituent element of the engaging structure) that will be described later (see FIGS. 6 and 7). In this example embodiment, the first attaching portion 11 is formed on the side frames 6b (i.e., the outside portion 16 and the inside portion 17), and is arranged facing a second attaching portion 12 that will be described later. At this time, the sitting side of the outside portion 16 protrudes in the seat width direction, and forms an outer edge (i.e., a first edge) of the first attaching portion 11. Also, the inside portion 17 (i.e., an inside end thereof) forms an inner edge (i.e., a second edge) of the first attaching portion 11.

The support member 20 is a member that supports the occupant, and has a shape (that is generally rectangular) that follows the shape of the sitting side of the frame member 6F (see FIGS. 2 and 5 to 7). The support member 20 in this example embodiment has an outer shape that is slightly wider in width than the frame member 6F, and includes a frame-shaped body 20a, a sheet-shaped body 20b, and the second attaching portion 12.

The frame-shaped body 20a is a frame-shaped member that can be attached to the frame member 6F, and is a member that is typically made of resin (see FIGS. 2 and 5 to 7). Here, the material of the frame-shaped body 20a is not particularly limited, and may be a thermoplastic resin (such as polypropylene, vinyl chloride resin, or polyethylene) or a thermosetting resin (such as phenolic resin, melamine resin, epoxy resin, or urea resin), for example. The frame-shaped body 20a of this example embodiment has a hollow center, and includes a base structure (i.e., an upper frame portion 22, a pair of side frame portions 24, and a lower frame portion 26), and assembly portions 51 and 52 that will be described later. The lower frame portion 26 is a flat plate portion of the lower portion of the frame-shaped body 20a.

Figure 5:
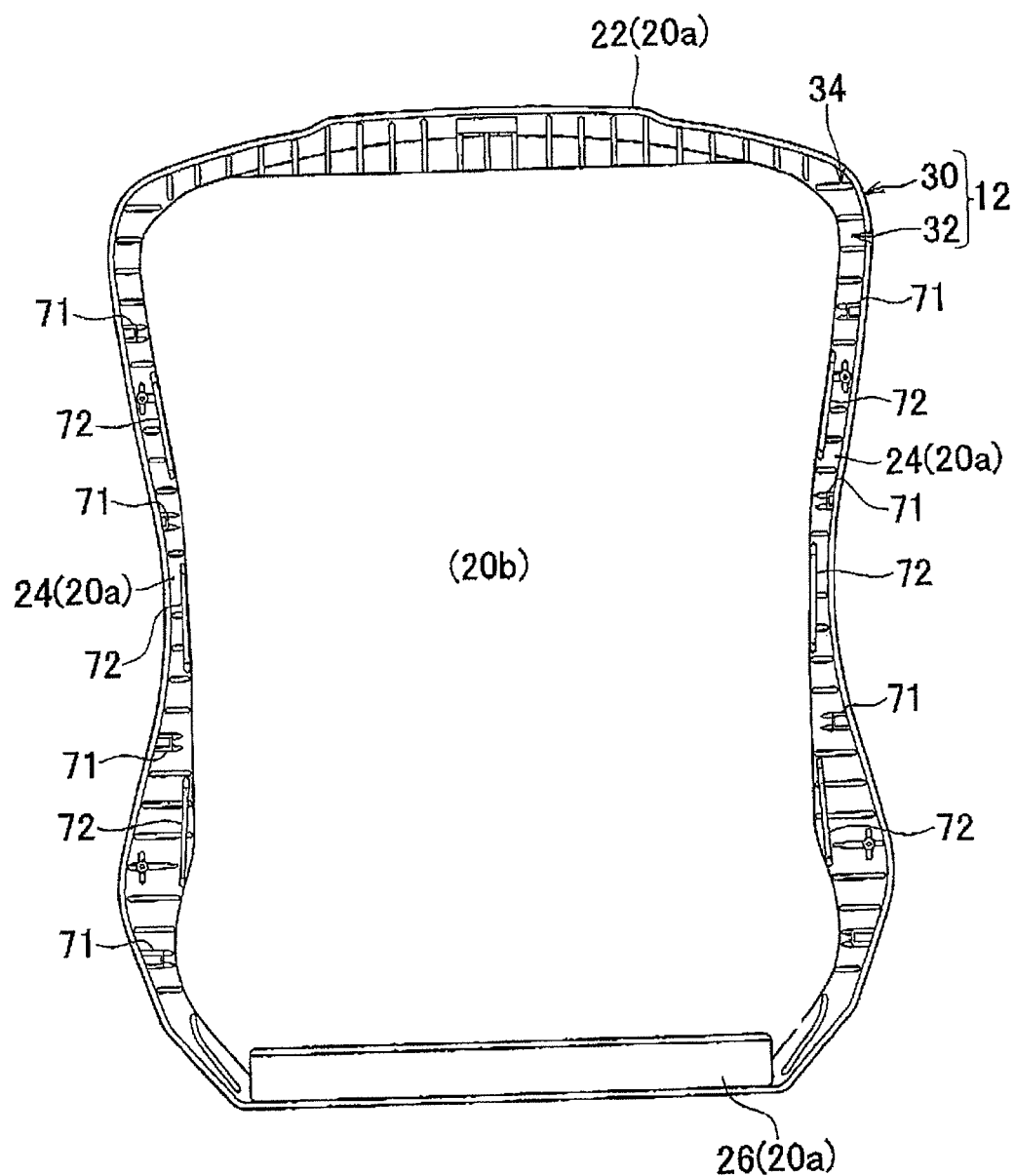
FIG. 5 is a front view of the support member.

The upper frame portion 22 and the side frame portions 24 form a general L-shape (in a sectional view), and each has an outer frame portion 30, an inner frame portion 32, and a plurality of reinforcing portions 34 (see FIG. 5). The outer frame portion 30 is a flat plate portion that forms the outer shape of the frame-shaped body 20a. Also, the inner frame portion 32 is a portion that curves toward the inside from an outer edge of the outer frame portion 30 so as to be able to face the side frame (i.e., the inside portion 17). Also, the reinforcing portions 34 are plate portions (that are rib-shaped) that stand upright spanning between the outer frame portion 30 and the inner frame portion 32, and are structures for reinforcing the support member 20. In this example embodiment, the plurality of reinforcing portions 34 are formed at predetermined intervals along the outer periphery of the frame-shaped body 20a (only one of the reinforcing portions is denoted by a reference character in FIG. 5 for simplicity).

The second attaching portion 12 is a portion that can be overlapped with the first attaching portion 11, and includes a first engaging portion 71 and a second engaging portion 72 (i.e., constituent elements of the engaging structure) (see FIGS. 5 to 7). In this example embodiment, the second attaching portion 12 is formed on the side frame portions 24 (i.e., the outer frame portion 30 and the inner frame portion 32) and is arranged facing the first attaching portion 11. Also, by assembling the support member 20 to the frame member 6F, the outer frame portion 30 is made to overlap with the outside portion 16 and the inner frame portion 32 is made to overlap with the inside portion 17.

The sheet-shaped body 20b is a sheet-shaped member that elastically supports the occupant. This sheet-shaped body 20b is preferably a member that is able to elastically expand and contract (see FIGS. 1 to 3). Here, the type of sheet-shaped body 20b is not particularly limited, and may be fabric (woven, knit, or nonwoven), leather (natural leather or synthetic leather), or a net body (i.e., a member in which fibers are woven into a mesh). Incidentally, the net body may be such that the fibers (natural fibers or synthetic fibers) are two-dimensionally or three-dimensionally interlaced.

In this example embodiment, the sheet-shaped body 20b (i.e., the net body) is attached in the center of the frame-shaped body 20a (i.e., the hollow center of the sheet-shaped body 20b) (see FIGS. 6 and 7). Incidentally, the method by which the sheet-shaped body 20b is attached to the frame-shaped body 20a is not limited. For example, the sheet-shaped body 20b may be stretched across a cavity of a forming die when forming the resin frame-shaped body 20a. Then the sheet-shaped body 20b may be integrally attached while forming the frame-shaped body 20a, by pouring molding raw material (such as molten resin) into the forming die. More specifically, the edge portion of the sheet-shaped body 20b may be integrated with the frame-shaped body 20a by the resin of the support member 20 getting into the mesh of the edge portion of the sheet-shaped body 20b and hardening.

Figure 3:
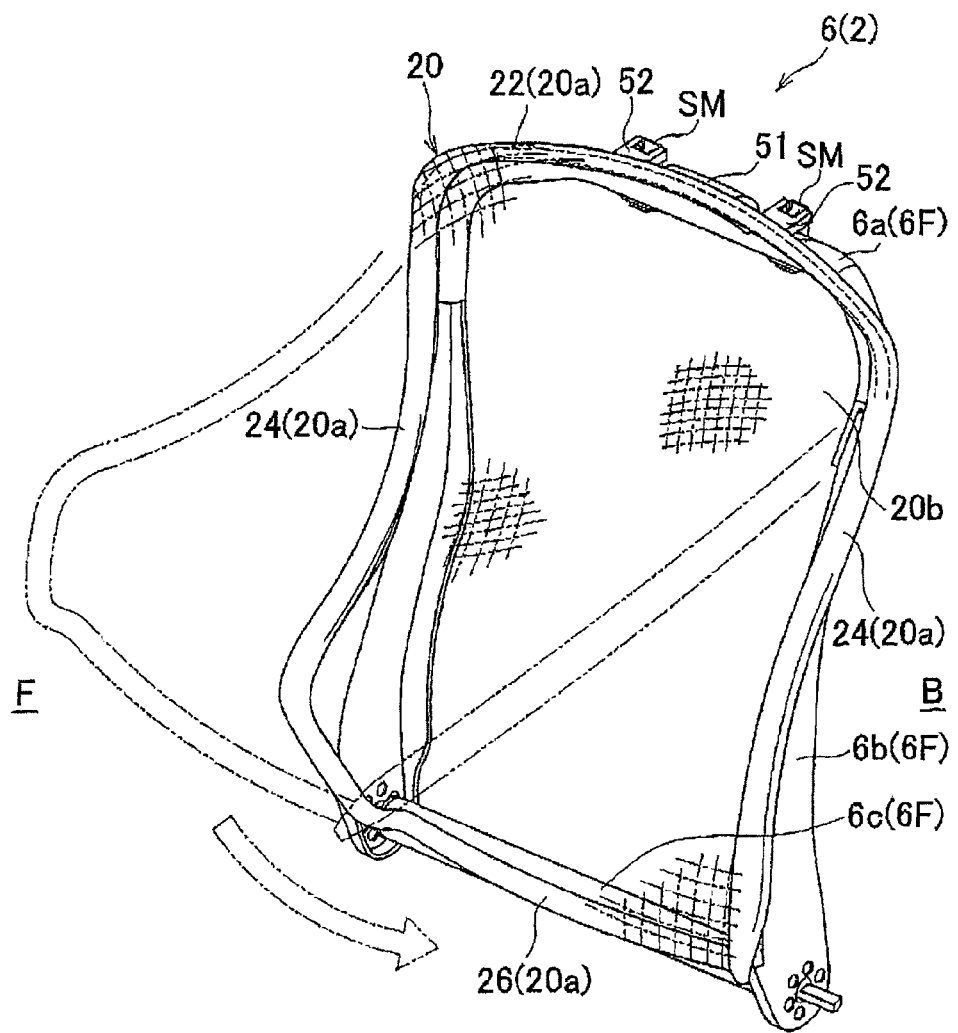
FIG. 3 is a perspective view of the frame member and the support member in the process of being attached together.
Figure 4:
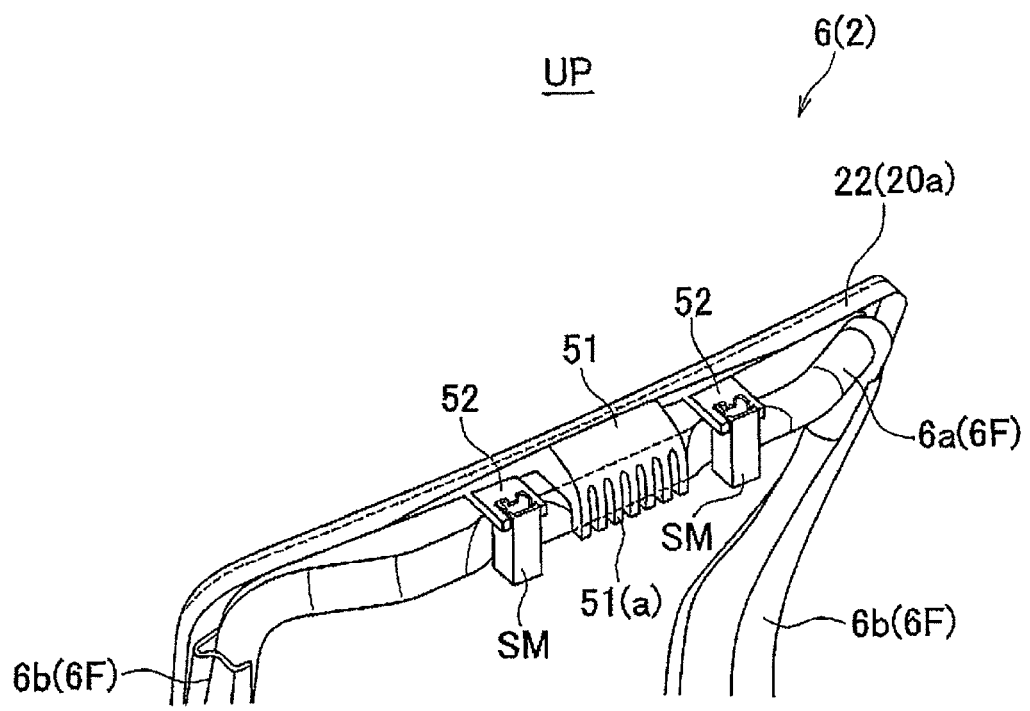
FIG. 4 is a perspective view of a portion of a seat back.

In this example embodiment, a plurality of attaching portions (i.e., a first attaching portion 51 and second attaching portions 52) may be formed on the frame-shaped body 20a (see FIGS. 2 to 4). The first attaching portion 51 is a portion for attaching the upper portion of the support member 20 to the frame member 6F. Also, this first attaching portion 51 is a generally rectangular portion (when viewed from above), and includes an engaging portion 51a that engages with the upper frame 6a (see FIG. 4). Also, the engaging portion 51a is a portion that curves downward from the rear side of the first attaching portion 51, and has a plurality of cuts formed at equidistant intervals in it. That is, the engaging portion 51a is formed in a comb shape. In this example embodiment, the first attaching portion 51 is arranged in the center on the rear side of the upper frame portion 22 and juts out toward the rear (facing the frame member 6F). The support member 20 is assembled to the frame member 6F by engaging the engaging portion 51a with the upper frame 6a, as will be described later.

Also, the second attaching portions 52 are generally U-shaped portions when viewed from above, and are able to be assembled to the support members SM (see FIG. 4). In this example embodiment, the pair of second attaching portions 52 are arranged on the rear side of the upper frame portion 22, jutting out toward the rear. At this time, the pair of second attaching portions 52 are arranged parallel, one on each side, a predetermined distance apart from each other, facing the support members SM. Also, during assembly of the support member 20, the support members SM are inserted into and held by the pair of second attaching portions 52.

The engaging structure is a structure for engaging the support member 20 with the frame member 6F, and includes the first engaging portion 71, the second engaging portion 72, and the engagable portion 77 (see FIGS. 5 to 7). Also in this example embodiment, the engagable portion 77 is provided on the first attaching portion 11, and the first engaging portion 71 and the second engaging portion 72 are provided on the second attaching portion 12.

The engagable portion 77 is a portion that is able to hook onto the first engaging portion 71 (see FIG. 6). The engagable portion 77 in this example embodiment is a through-hole provided in the side frames 6b (i.e., the sitting side of the outside portion 16). Forming the engagable portion 77 on the sitting side of the outside portion 16 in this way enables the first engaging portion 71 (i.e., a retaining pawl 74) that will be described later to be inserted.

The first engaging portion 71 is a portion that protrudes toward the inside of the seat from the outer frame portion 30, and includes a guide portion 73, a retaining pawl 74, and an abutting portion 75 (see FIG. 6). The guide portion 73 is a portion (with a triangular shape in a cross-sectional view) that protrudes at an angle toward the inside of the seat from partway along the outer frame portion 30. Also, the retaining pawl 74 is a protruding portion at the tip end of the guide portion 73, and the abutting portion 75 is a portion (with a rectangular shape in a cross-sectional view) that is formed between the retaining pawl 74 and the inner frame portion 32. In this example embodiment, the amount that the first engaging portion 71 protrudes is adjusted, and the retaining pawl 74 is retained in the engagable portion 77 (i.e., the through-hole) while the abutting portion 75 is abutted against the outside portion 16 (i.e., the outer edge of the first attaching portion 11).

The second engaging portion 72 of this example embodiment is a portion (generally rectangular in a sectional view) that protrudes out toward the rear of the seat from the second attaching portion 12 (i.e., the inner frame portion 32) (see FIG. 7). In this example embodiment, the position in which the second engaging portion 72 is formed is adjusted, and the second engaging portion 72 is made to abut against the inside edge of the inside portion 17 (i.e., the second edge of the first attaching portion 11). In this embodiment, the first edge is on one side on the first attaching portion 11 and the second edge is on the opposite side of the first attaching portion 11.

Also in this example embodiment, the first engaging portion 71 and the second engaging portion 72 are arranged alternately along the frame-shaped body 20a (see FIG. 5). Arranging the first engaging portion 71 and the second engaging portion 72 alternately in this way enables the first attaching portion 11 to be held with an appropriate amount of gripping force. Therefore, the first attaching portion 11 can be relatively easily attached between the first engaging portion 71 and the second engaging portion 72, as well as relatively easily detached from both engaging portions. That is, the structure provides excellent attachability and detachability.

The support member 20 is assembled to the frame member 6F as shown in FIGS. 1 to 4. In this example embodiment, the support member 20 is able to be positioned in the vertical direction of the seat by hooking the first attaching portion 51 onto the upper frame 6a. Next, the lower portion of the support member 20 is rotated toward the frame member 6F, with the first attaching portion 51 as the center of rotation, and the support member 20 is assembled from the sitting side of the frame member 6F. Then the upper portion of the support member 20 is able to be attached to the frame member 6F by inserting the support members SM into the second attaching portions 52.

Next, the first attaching portion 11 and the second attaching portion 12 are overlapped (from the sitting side of the seat), as shown in FIGS. 5 to 7. At this time, the first attaching portion 11 moves along the guide portion 73 (i.e., the angled portion) and is guided to the second attaching portion 12. Then the attaching portions 11 and 12 are overlapped such that the abutting portion 75 of the first engaging portion 71 abuts against the outside portion 16 and the second engaging portion 72 abuts against the inside portion 17. Further, the retaining pawl 74 is inserted into the engagable portion 77 so that the engagable portion 77 hangs on the first engaging portion 71. As a result, the support member 20 is able to be attached to the frame member 6F. Incidentally, the outside portion 16 may serve as the first edge of the other portion of the invention, and the inside portion 17 may serve as the second edge of the other portion of the invention.

In this example embodiment, the supplementary portion 60 can be arranged on both sides of the support member 20 (see FIGS. 6 and 7). The supplementary portion 60 of this example embodiment is a member that covers the frame member 6F while complementing the support member 20, and includes a cover portion 6S and a cushion 6P. The cover portion 6S may be made of fabric, leather, or a net body, and may be formed by a plurality of cover pieces. Also, the cushion 6P is a member that is generally fan shaped (in a cross-sectional view), and can be made of material that is elastic, such as polyurethane foam. In this example embodiment, the cushion 6P is covered by the cover portion 6S while being arranged on the side of the support member 20. One end side of the cover portion 6S is sewn to the sheet-shaped body 20b, and the other end side of the cover portion 6S is sewn to the frame-shaped body 20a. The supplementary portion 60 is able to support a side portion of the occupant by protruding out toward the front of the seat at a position on the side of the seat. That is, the supplementary portion 60 serves as a side support.

After appropriately removing the supplementary portion 60, the support member 20 can be detached from the frame member 6F, as shown in FIGS. 6 and 7. At this time, in this example embodiment, the outside portion 16 is separated from the outer frame portion 30 by bending the outer frame portion 30 toward the outside of the seat away from the inner frame portion 32 (i.e., spreading the frame portions apart from each other by deforming them), for example. The support member 20 can be detached relatively easily from the frame member 6F from the sitting side by disengaging the first engaging portion 71 from the engagable portion 77 while separating the outside portion 16 in this way.

As described above, in this example embodiment, the support member 20 can be compactly engaged to the frame member 6F from the sitting side of the seat. Also, in this example embodiment, the first engaging portion 71 is hooked onto the engagable portion 77 while the first attaching portion 11 is held by the first engaging portion 71 and the second engaging portion 72. That is, that structure provides excellent attachment stability. Also, in this example embodiment, arranging the first engaging portion 71 and the second engaging portion 72 alternately enables the first attaching portion 11 to be held with an appropriate amount of gripping force. That is, the structure enables excellent attachability and detachability. Therefore, with this example embodiment, the support member 20 is able to be compactly attached to and detached from the frame member 6F while maintaining the utmost attachment stability.

The vehicle seat in this example embodiment is not limited to the example embodiment described above, but may also be carried out by other various example embodiments. For example, in this example embodiment, the first engaging portion 71 and the second engaging portion 72 are provided on the second attaching portion 12, and the engagable portion 77 is provided on the first attaching portion 11. Alternatively, however, the first engaging portion 71 and the second engaging portion 72 may be provided on the first attaching portion 11, and the engagable portion 77 may be provided on the second attaching portion 12. Also, in this example embodiment, the first engaging portion 71 hooks onto the engagable portion 77. Alternatively, the second engaging portion 72 may hook onto the engagable portion 77.

Also in this example embodiment, the first engaging portion 71 and the second engaging portion 72 are formed alternately (intermittently). Alternatively, at least one of the first engaging portion 71 or the second engaging portion 72 may be formed continuously on the second attaching portion 12. Also in this example embodiment, the retaining pawl 74 of the first engaging portion 71 is inserted into and retained by the engagable portion 77 (i.e., the through-hole). Alternatively, however, a convex portion that juts out on the seat side may be formed on the engagable portion 77, and the engagable portion 77 may hook onto the first engaging portion 71 by hooking this engagable portion 77 (i.e., the convex portion) onto the retaining pawl 74. Also in this example embodiment, the second engaging portion 72 engages with the inside edge of the first attaching portion 11, but the location where the second engaging portion 72 engages is not limited to this. For example, the second engaging portion 72 may be formed in the center of the inner frame portion 32, and a hole may be formed in the center of the inside portion 17. The second engaging portion 72 may be inserted into the hole so as to engage with the peripheral edge (another example of the second edge) of the hole. Also, the second engaging portion may be any one of various shapes, such as generally oblong, generally rectangular, or generally semicircular. Also in this example embodiment, the seat back 6 is one example of a seat structure member. However, the structure of this example embodiment may be applied to any one of a variety of seat structure members such as a seat cushion.

In this example embodiment, the first engaging portion 71 and the second engaging portion 72 are provided. Alternatively, however, only the first engaging portion 71 may be provided and this first engaging portion 71 may hook onto the engagable portion 77. In this case, the first engaging portion 71 may be provided on either the first attaching portion 11 or the second attaching portion 12.

What is claimed is:

1. A vehicle seat that includes a seat structure member that has a frame member that forms a seat frame, and a support member that supports an occupant, comprising:
    an engaging structure that detachably attaches the support member to the frame member, wherein
    the frame member has a first attaching portion formed along at least one portion of a sitting side of the frame member, and the first attaching portion includes an engagable portion, and
    the support member has a second attaching portion that is overlapped with the first attaching portion, and the second attaching portion has a side frame portion that is generally L-shaped in a cross-sectional view, the side frame portion having an outer frame portion and an inner frame portion, wherein
    the engaging structure includes the outer frame portion and the inner frame portion, and the outer frame portion has a first engaging portion and the inner frame portion has a second engaging portion, the first engaging portion and the second engaging portion being provided on the second attaching portion, and the engagable portion being provided on the first attaching portion, the first engaging portion is abutted against a first edge of the first attaching portion, and the second engaging portion is abutted against a second edge of the first attaching portion, the first engaging portion has a retaining pawl that protrudes through a through-hole provided in the engagable portion such that the support member is engaged with the frame member, and the second engaging portion protrudes toward a rear side of the vehicle seat, and the first engaging portion and the second engaging portion are alternately arranged along a longitudinal length of the vehicle seat.

2. The vehicle seat according to claim 1, wherein the first edge is on one side of the first attaching portion, and the second edge is on an opposite side of the first attaching portion.

3. The vehicle seat according to claim 1, wherein the seat structure member is one of a seat cushion and a seat back.

* * * * *